(12) United States Patent
December et al.

(10) Patent No.: US 7,544,413 B2
(45) Date of Patent: *Jun. 9, 2009

(54) COATINGS AND COATING SYSTEMS HAVING OPTIMIZED CHIP PERFORMANCE AND METHODS OF OBTAINING THE SAME

(76) Inventors: Timothy S. December, 546 Parkland, Rochester Hills, MI (US) 48307; Marc Bennett Fenwick, 2188 Shire Ct., Commerce Township, MI (US) 48382; Yoshiko Kobayashi-San, 2843 Mystic Dr., Ann Arbor, MI (US) 48103; Scott Kubish, 545 Hobart Ct., Saline, MI (US) 48176; JoAnn Lanza, 30935 Crest Forest, Farmington Hills, MI (US) 48331; Ippei Shinohara, 44229 Winthrop Dr., Novi, MI (US) 48375

( * ) Notice: Subject to any disclaimer, the term of this patent is extended or adjusted under 35 U.S.C. 154(b) by 665 days.

This patent is subject to a terminal disclaimer.

(21) Appl. No.: 11/106,285

(22) Filed: Apr. 14, 2005

(65) Prior Publication Data

US 2006/0234036 A1    Oct. 19, 2006

(51) Int. Cl.
*B32B 27/20* (2006.01)
*C08K 3/22* (2006.01)

(52) U.S. Cl. .................. 428/328; 428/409; 428/411.1; 428/423.1; 428/480; 524/497; 427/402; 427/407.1; 427/419.5

(58) Field of Classification Search .................. None
See application file for complete search history.

(56) References Cited

U.S. PATENT DOCUMENTS 4,602,053 A * 7/1986 Huybrechts et al. ......... 523/436

* cited by examiner

*Primary Examiner*—Monique R Jackson
(74) *Attorney, Agent, or Firm*—Cantor Colburn LLP

(57) ABSTRACT

Disclosed is a film-forming composition comprising a binder and a pigment mixture present in a pigment to binder ratio of at least 0.8. The pigment mixture consists of at least 80% of titanium dioxide by weight and no more than 20% by weight of non-titanium dioxide pigments, based on the total weight of the pigment mixture, said non-titanium dioxide pigments being selected from the group consisting of carbon black, talc, barium sulfate, magnesium silicate, and combinations comprising two or more of the foregoing. The composition has an adjusted VOC of no more than 100 g/L, is free of all pigments other than those in the pigment mixture, has a viscosity of no more than 200 cps at 384 $\sec^{-1}$, and provides a cured film having an elasticity of at least 20%. The composition provides multilayer coating systems having improved chip performance.

19 Claims, No Drawings

COATINGS AND COATING SYSTEMS HAVING OPTIMIZED CHIP PERFORMANCE AND METHODS OF OBTAINING THE SAME

FIELD OF THE INVENTION

The invention relates to thermoset coatings and coating systems having improved chip performance, especially automotive coatings and coating systems and methods of obtaining the same.

BACKGROUND OF THE INVENTION

Curable thermoset coating compositions are widely used in the coatings art. They are often used as topcoats in the automotive and industrial coatings industry. Such topcoats may be basecoats, clearcoats, or mixtures thereof. Color-plus-clear composite coatings are particularly useful as topcoats where exceptional gloss, depth of color, distinctness of image, or special metallic effect is desired. The automotive industry has made extensive use of these coatings for automotive body panels.

Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI). Finally, such composite coatings must also simultaneously provide a desirable balance of finished film properties such as chip performance, durability, hardness, flexibility, and resistance to environmental etch, scratching, marring, solvents, and/or acids.

Chip performance or gravel resistance is particularly important in automotive coatings, especially those intended for use on automotive components with leading edges, such as rocker panels and front bumpers. Weak or poor resistance to chipping can result in significant damage to the overall vehicle appearance and greatly reduced durability.

Prior art automotive coating systems have long sought individual coatings or coating systems that provide such desirable chip resistance. It would be particularly advantageous to obtain a single coating that could be used to provide improved chip resistance in a wide variety of coating systems employing various types of topcoats.

The prior art has also long sought a way to improve chip resistance that is independent of the chemistry or molecular structure of the resin or binder component of a particular coating.

Of course, improvements in chip resistance must not be obtained at the expense of other important properties such as appearance and VOC.

In order to obtain the extremely smooth finishes that are generally required in the coatings industry, coating compositions must exhibit good flow before curing. Good flow is observed when the coating composition is fluid enough at some point after it is applied to the substrate and before it cures to a hard film to take on a smooth appearance. Some coating compositions exhibit good flow immediately upon application and others exhibit good flow only after the application of elevated temperatures.

One way to impart fluid characteristics and good flow to a coating composition is to incorporate volatile organic solvents into the composition. These solvents provide the desired fluidity and flow during the coating process, but evaporate upon exposure to elevated curing temperatures, leaving only the coating components behind.

However, the use of such solvents increases the volatile organic content (VOC) of the coating composition. Because of the adverse impact that volatile organic solvents may have on the environment, many government regulations impose limitations on the amount of volatile solvent that can be used. Increasing the percentage nonvolatile (%NV) of a coating composition or decreasing the VOC provides a competitive advantage with respect to environmental concerns, air permitting requirements and cost.

There is thus a continuing desire to obtain thermoset coatings having an improved chip performance while still possessing the optimum balance of performance properties required by the automotive industry. This optimum balance of performance properties in the finished film must be obtained without sacrificing the rheological properties of the coating composition required for trouble-free application of the composition while still maintaining the optimum level of smoothness and appearance.

It would be particularly advantageous to obtain coatings useful as primers that provide in improvements in chip resistance, especially in multilayer coating systems.

SUMMARY OF THE INVENTION

In one embodiment, a film-forming composition is disclosed that comprises a film-forming binder and a pigment mixture, said pigment mixture present in a pigment to binder ratio of at least 0.8. The pigment mixture consists of (i) at least 80% of titanium dioxide by weight, based on the total weight of the pigment mixture, and (ii) no more than 20% by weight of non-titanium dioxide pigments based on the total weight of the pigment mixture, said non-titanium dioxide pigments being selected from the group consisting of carbon black, barium sulfate, magnesium silicate, and combinations comprising two or more of the foregoing. The disclosed film-forming composition of this embodiment has an adjusted VOC of no more than 100 g/L, is free of all pigments other than those in the pigment mixture, has a viscosity of no more than 200 cps ( at 384 sec−1), and when cured for 25 minutes at 150° C. provides a cured film having an elasticity of at least 20% at a dry film build of from 0.8 to 2.0 mil on cold rolled steel.

In another embodiment, a multilayer coating system is disclosed that consists essentially of a substrate, an electrodeposition coating, a primer composition, and a topcoat. The primer composition comprises a film-forming binder and a pigment mixture, said pigment mixture present in a pigment to binder ratio of at least 0.8 and consisting of (i) at least 80% of titanium dioxide by weight, based on the total weight of the pigment mixture, and (ii) no more than 20% by weight of non-titanium dioxide pigments based on the total weight of the pigment mixture, said non-titanium dioxide pigments being selected from the group consisting of carbon black, barium sulfate, magnesium silicate, and combinations comprising two or more of the foregoing. The primer composition has an adjusted VOC of no more than 100 g/L, is free of all pigments other than those in the pigment mixture, and has a viscosity of no more than 200 cps at 384 sec$^{-1}$.

Also disclosed is a method of making a multilayer coating system, consisting of applying a primer composition to a substrate to provide a primed substrate, applying a topcoat to the primed substrate, and curing the topcoat to provide a cured multilayer coating system. In this embodiment, the cured multilayer coating system has a chip performance of no more than 2% paint loss and the primer composition comprises a film-forming binder, and a pigment mixture, said pigment mixture present in a pigment to binder ratio of at least 0.8 and consisting of (i) at least 80% of titanium dioxide by weight, based on the total weight of the pigment mixture, and (ii) no more than 20% by weight of non-titanium dioxide pigments based on the total weight of the pigment mixture, said non-titanium dioxide pigments being selected from the group consisting of carbon black, barium sulfate, magnesium silicate, and combinations comprising two or more of the foregoing. The primer composition has an adjusted VOC of no more than 100 g/L, is free of all pigments other than those in the pigment mixture, has a viscosity of no more than 200 cps at 384 $sec^{-1}$, and has an elasticity of at least 20% at a dry film build of from 0.8 to 2.0 mil on cold rolled steel.

Also disclosed is a method of making a multilayer coating system having a chip performance of no more than 2% paint loss, comprising applying a primer composition to a substrate to provide a primed substrate, said primer composition having an elasticity of at least 20% at a dry film build of from 0.8 to 2.0 mil on cold rolled steel and comprising a film-forming binder, and a pigment mixture, said pigment mixture present in a pigment to binder ratio of at least 0.8 and consisting of (i) at least 80% of titanium dioxide by weight, based on the total weight of the pigment mixture, and (ii) no more than 20% by weight of non-titanium dioxide pigments based on the total weight of the pigment mixture, said non-titanium dioxide pigments being selected from the group consisting of carbon black, barium sulfate, magnesium silicate, and combinations comprising two or more of the foregoing, applying a topcoat to the primed substrate, and curing the topcoat to provide a cured multilayer coating system, wherein the cured multilayer coating system has a chip performance of no more than 2% paint loss.

Finally, a method of making a coated substrate is disclosed, comprising applying the disclosed film-forming composition to a substrate and curing the applied coating to provide a coated substrate.

DETAILED DESCRIPTION OF THE INVENTION

The following description of the preferred embodiment(s) is merely exemplary in nature and is in no way intended to limit the invention, its application, or uses. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The modifier "about" used in connection with a quantity is inclusive of the stated value and has the meaning dictated by the context (e.g., includes the degree of error associated with measurement of the particular quantity).

The invention provides a thermoset coating composition that is film forming. In one embodiment, the disclosed coating composition forms a film when subject to energy, especially thermal energy, actinic radiation, or combinations thereof. The film-forming composition comprises a film-forming binder and a pigment mixture.

In one embodiment, the disclosed coating compositions will comprise a film-forming binder comprising one or more active hydrogen containing compounds, also referred to herein as crosslinkable resins, and one or more crosslinking agents.

"Active hydrogen group" as used herein refers to functional groups that donate a hydrogen group during the reaction with the functional groups of the one or more crosslinking agents. Examples of active hydrogen groups are carbamate groups, hydroxyl groups, amino groups, thiol groups, acid groups, hydrazine groups, activated methylene groups, and the like. Preferred active hydrogen groups are carbamate groups, hydroxyl groups, and mixtures thereof.

The one or more crosslinkable resins may be any crosslinkable resin suitable for use in a waterborne, solvent-based, powder coating composition, powder slurry composition, primer, topcoat, basecoat, or clearcoat. In one exemplary embodiment, the crosslinkable resin will be suitable for use in a primer composition, especially a waterborne or aqueous powder slurry composition.

As used herein, the term "crosslinkable resin" is intended to include not only those resins capable of being crosslinked upon application of heat but also those resins which are capable of being crosslinked without the application of heat. Examples of such crosslinkable resins include thermosetting acrylics, aminoplasts, carbamate functional resins, polyesters, epoxies, silicones and polyamides, modified acrylic polymers, polycarbonates, polyurethanes, polyimides, and polysiloxanes. These resins, when desired, may also contain functional groups characteristic of more than one class, as for example, polyester amides, urethane acrylates, carbamate acrylates, etc.

In one embodiment, the crosslinkable resin will be at least one of acrylic polymers, modified acrylics, or polyester polyurethane polymers. In another embodiment, the crosslinkable resin will be an acrylic or polyurethane polymer.

In one embodiment of the invention, the crosslinkable resin is an acrylic polymer. Suitable acrylic polymers may have a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as the crosslinkable resin. Such acrylics may be polyester-modified acrylics or polyurethane-modified acrylics, as is well known in the art. Polyester-modified acrylics modified with E-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Preferred carbamate functional acrylics useful as the crosslinkable resin can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing one or more polymers or oligomers useful as the crosslinkable resin is to react an already-formed polymer such as an acrylic polymer with another component to form a carbamate-functional group appended to the polymer backbone, as described in U.S. Pat. No. 4,758,632, the disclosure of which is incorporated herein by reference. Another technique for preparing polymers useful as the crosslinkable resin involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form a carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the most preferred carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

In one embodiment, polymers useful as the crosslinkable resin will generally have a number average molecular weight of 2000-20,000, and preferably from 3000-6000. The carbamate content of the polymer, on a molecular weight per equivalent of carbamate functionality, will generally be between 200 and 1500, and preferably between 300 and 500.

Polyesters having active hydrogen groups such as hydroxyl groups can also be used as the crosslinkable resin in the disclosed coating composition. Such polyesters are well known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Carbamate functional polyesters are also suitable for use as the crosslinkable resin in the disclosed coating compositions. Suitable polyesters can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare suitable polyesters include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component can comprise all diols, polyols of higher functionality can also be used. It is preferred that the polyol be a mixture of at least one diol and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is generally less than 3.3/1, preferably up to 1.4/1.

Carbamate groups can be incorporated into the polyester by first forming a hydroxyalkyl carbamate that can be reacted with the polyacids and polyols used in forming the polyester. A polyester oligomer can be prepared by reacting a polycarboxylic acid such as those mentioned above with a hydroxyalkyl carbamate. An example of a hydroxyalkyl carbamate is the reaction product of ammonia and propylene carbonate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid with a hydroxy functional polyester. Also, carbamate functionality can be incorporated into the polyester by reacting a hydroxy functional polyester with urea.

Carbamate groups can also be incorporated into the polyester by a transcarbamalation reaction. In this reaction, a low molecular weight carbamate functional material derived from a low molecular weight alcohol or glycol ether such as methyl carbamate is reacted with the hydroxyl groups of a hydroxyl functional polyester, yielding a carbamate functional polyester and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Besides carbamate functionality, polyester polymers and oligomers suitable for use as the crosslinkable resin may contain other functional groups such as hydroxyl, carboxylic acid and/or anhydride groups. The equivalent weight of such polyesters containing terminal carbamate groups may be from about 140 to 2500, based on equivalents of carbamate groups. The equivalent weight is a calculated value based on the relative amounts of the various ingredients used in making the polyester, and is based on the solids of the material.

Polyurethanes having active hydrogen functional groups such as described above which are suitable for use as the crosslinkable resin are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Carbamate functional polyurethanes may be prepared by reacting the active hydrogen groups with a low molecular weight carbamate functional material derived from a low molecular weight alcohol or glycol ether such as methyl.

Other carbamate functional compounds preferred for use as a crosslinkable resin are carbamate-functional compounds which are the reaction product of a mixture comprising a polyisocyanate or a chain extended polymer, and a compound comprising a group that is reactive with isocyanate or a functional group on the chain extended polymer as well as a carbamate group or group that can be converted to carbamate. Such compounds are described in U.S. Pat. Nos. 5,373,069 and 5,512,639 hereby incorporated by reference.

In one exemplary embodiment, the crosslinkable resin may be at least one of carbamate functional acylics, carbamate functional modified acrylics, hydroxyl functional acrylics, hydroxyl functional modified acrylics, polyurethanes, polyesters and mixtures thereof.

The disclosed curable or film-forming coating compositions are crosslinkable. In one exemplary embodiment, the disclosed compositions will crosslink via themselves i.e., self crosslinking, or with a crosslinking agent. and will thus comprise one or more crosslinking agents having one or more crosslinkable functional groups. Such groups include, for example, hydroxy, isocyanate, amine, epoxy, acrylate, vinyl, silane, and acetoacetate groups. Such groups may be blocked or unblocked. In one embodiment, such functional groups may be masked or blocked in such a way as to become unblocked and available for cross-linking under a desired curing condition or event, generally elevated temperatures.

Useful crosslinkable functional groups include hydroxy, epoxy, acid, anhydride, silane, and acetoacetate groups and/or active methylol or methylalkoxy groups. In one embodiment, suitable crosslinking agents will have at least one crosslinkable functional groups selected from hydroxy functional groups, amino functional groups, isocyanate groups, and active methylol or methylalkoxy groups.

Illustrative crosslinkers include, without limitation, melamine formaldehyde crosslinkers, including monomeric or polymeric melamine resin and partially or fully alkylated melamine resin, urea resins, and methylol ureas such as urea formaldehyde resin, alkoxy ureas such as butylated urea formaldehyde resin, and polyisocyanates and blocked polyisocyanates. The curing agent may be a combination of the foregoing. In one exemplary embodiment, the crosslinking agent of the film-forming binder will be at least one of a polyisocyanates or an aminoplast resin.

In one embodiment, the crosslinking agent is at least about 5%, more preferably at least about 10% by weight of the nonvolatile binder or vehicle, with the remainder of the nonvolatile binder being comprised of the crosslinkable resin. "Nonvolatile vehicle" refers to the solid portion of the film-forming or crosslinking components of the binder. It is also preferred for the crosslinking agent to be up to about 40%, more preferably up to about 30% by weight of the nonvolatile vehicle. In one embodiment, the crosslinking agent is preferably from about 5% to about 40% by weight of the nonvolatile vehicle.

The film-forming compositions further comprise a pigment mixture. In one embodiment, the pigment mixture consists of (i) titanium dioxide and (ii) non-titanium dioxide pigments.

In one exemplary embodiment, the pigment mixture will consist of pigment particles having a particle shape that is as close to spherical as possible. It will be appreciated that pigment particles having platelet shape or elliptical shapes are favored over block shaped pigment particles. In one exemplary embodiment, the pigment mixture will consist of pigments having spherical particles.

In one exemplary embodiment, the pigment mixture will be substantially free of any coloring pigment, effect pigment, filler pigment, and extender pigment other than pigments (i) and (ii). In another exemplary embodiment, the film-forming coating composition will be substantially free of any coloring pigment, effect pigment, filler pigment, and extender pigment other than pigments (i) and (ii) present in the pigment mixture.

Pigment (i) consists of titanium dioxide ($TiO_2$). Suitable titanium dioxides include those commercially available for use in film-forming coating applications. Suitable titanium dioxides may be characterized by excellent color, opacity, dispersibility, heat stability, light fastness, high refractive index, and resistance to chemicals, acids, and alkali materials. In one exemplary embodiment, the titanium dioxide pigment (i) will be rutile titanium dioxide. In one especially exemplary embodiment, the titanium dioxide pigment (i) will be rutile titanium dioxide having spherical particles and a refractive index of at least about 2.5, more especially of at least about 2.75.

In one embodiment, the non-titanium dioxide pigments are selected from the group consisting of carbon black, talc, barium sulfate, magnesium silicate, and combinations comprising two or more of the foregoing. In one exemplary embodiment, the non-titanium dioxide pigment will be either barium sulfate or talc. In one especially exemplary embodiment, the non-titanium dioxide pigment (ii) will be barium sulfate.

In one exemplary embodiment, the pigment mixture consists of (i) at least about 80% of titanium dioxide by weight, based on the total weight of the pigment mixture, and (ii) no more than about 20% by weight of non-titanium dioxide pigments based on the total weight of the pigment mixture. In another embodiment, the pigment (i) will be present in an amount from about 80% to about 100% by weight, while pigment (ii) may be present in an amount from about 20% to about 0% by weight, all based on the total weight of the pigment mixture. In one especially exemplary embodiment, the pigment (ii) will be minimized to the extent possible. In another especially exemplary embodiment, the pigment (i) will be present in an amount from about 85% to about 95% by weight, based on the total weight of the pigment mixture.

The pigment mixture is present in the film-forming coating composition in an amount such that the composition has a pigment to binder (P/B) ratio of at least about 0.8. The P/B ratio is based upon the amount of solid pigment to the amount of film-forming binder. In another embodiment, the pigment mixture is present in an amount sufficient to provide a P/B ratio less than the Critical Pigment Volume Concentration (CPVC). The volume concentration or volume fraction of dispersed solid pigment phase in the polymeric binder of the coating is normally defined as the pigment volume concentration (PCV). CPVC may be defined as that concentration of pigments where there is just sufficient polymer matrix to wet and fill the voids between the individual particles.

In one exemplary embodiment, the pigment mixture will be present in an amount sufficient to provide a P/B ratio of less than about 0.95. In another exemplary embodiment, the pigment mixture is present in an amount sufficient to provide a P/B ratio of from about 0.85 to about 0.95.

While not wishing to be bound to a particular theory, it is believed that P/B ratios of the disclosed pigment mixture of less than about 0.8 result in cured films and multilayer coating systems using such cured films that have a less than optimized chip performance. P/B ratios greater than the CPVC are also believed to produce cured films having less than optimum chip performance.

The term 'chip performance' as used herein refers to chip or gravel resistance. This performance property of a cured film or cured multilayer coating system may be evaluated according to a Gravel Chip Test. A cured coated substrate is subjected to a Gravel Chip Test as follows. The cured coated substrate is cooled to −20 degree C. for at least one hour prior to the test. The cold substrate is positioned in a test machine, referred to as a 'gravelometer', in an upright position, 90 degrees from the path of gravel. Three pints of gravel are then blown onto the cold substrate with an air pressure of 70 PSI. The gravel is preferably water-worn road gravel, not crushed limestone or rock, which will pass through a ⅝" space screen when grated, but will be retained on a ⅜" space screen. A suitable gravelometer is available from Q-Panel Lab Products. The test substrate is then analyzed using image software and a scanner. The substrate is scanned and the image software measures the percent paint film loss from the surface of the substrate.

In one embodiment, the percent paint film loss can be obtained by scanning the test substrate as a black and white drawing on a HP Scanjet™ 4c having a resolution of 75 dpi and a contrast of 125 (on a 0 to 250 scale), wherein HP DeskScan™ II V2.4 software is utilized for scanning. The scanned image of the substrate can then be analyzed using Visilog™ 5.1 software available from Noesis Vision, Inc. Analysis of the test substrate may be performed on a 12.5 by 6.8 cm area of the substrate. The percent film loss can be calculated using the "Area" routine in the software. The software calculates the percent paint film loss based on the number of dark pixels versus the total number of pixels (approx. 74,000).

Alternately, the substrate can be visually evaluated and measured on a scale. In one embodiment, visual standards may be employed to determine the percent paint or film loss.

In one embodiment, a cured film having a % paint loss of equal to or less than about 2% has a desirable chip performance while those having a % paint loss greater than 2% may be characterized as having poor or undesirable chip performance. In one embodiment, a substrate after being prepared as discussed above with the disclosed coating composition, produces a paint film loss of from 0.05 to 0.8 percent according to the Gravel Chip Test.

It will be appreciated that as the film build of the disclosed coating composition increases, the paint film loss on the substrate decreases. In one embodiment, the paint film loss is reduced by about half when the film build of the disclosed coating composition is doubled. Therefore, the disclosed coating composition provides improved chip resistance as compared to previously known primers, while retaining other desirable properties, such as gloss, peel, and DOI.

Other materials well-known to the coatings artisan, for example, surfactants, stabilizers, wetting agents, dispersing agents, adhesion promoters, UV absorbers, light stabilizers such as HALS, antioxidants, solvents, catalysts, and/or rheology control agents, may be incorporated into the coating composition so long as the foregoing consideratios as to the pigment mixture are observed. The amount of these materials used must be controlled to achieve the desired performance properties and/or to avoid adversely affecting the coating characteristics.

A solvent or solvents may be utilized in the coating composition. In general, the solvent can be any organic solvent and/or water. In one preferred embodiment, the solvent includes a polar organic solvent. In another embodiment, the solvent includes one or more organic solvents selected from polar aliphatic solvents or polar aromatic solvents. In one embodiment, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In one especially exemplary embodiment, the solvent is water or a mixture of water with small amounts of co-solvents.

The disclosed coating compositions may be characterized as one-component, two-component, multi-component, solvent borne, water borne, aqueous, solventless, powder coating, powder slurry coating, dispersion, emulsion, and combinations thereof. In one embodiment, the film-forming coating composition will be a water borne coating or a one-component aqueous powder slurry coating.

In one embodiment, the disclosed film-forming coating composition will have a low VOC. In one exemplary embodiment, a 'low VOC' refers to a film-forming composition having an adjusted VOC of no more than 100 g/L of volatile organic solvent. Adjusted VOC as used herein refers to the concentration of volatile organic solvent per L of coating composition not including water.

Notwithstanding the low VOC requirements, the disclosed film-forming composition will have a viscosity of no more than about 200 cps at 384 $\sec^{-1}$. In one embodiment, the disclosed film-forming composition will have a viscosity of from about 110 cps to about 160 cps at 384 $\sec^{-1}$.

The disclosed film-forming coating compositions can be coated onto an article by any of a number of techniques well known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

The disclosed coating compositions form crosslinked films upon curing. Curing as used herein refers to the application of a stimulus such as thermal energy, electromagnetic energy or a combination thereof. Electromagnetic energy as used herein refers to actinic radiation and corpuscular radiation such as electron beam. In one embodiment, the film-forming coating composition will be curable upon the application of thermal energy.

The disclosed coating compositions when cured provide films of desirable gloss, elasticity, hardness and sandability. For example, in one embodiment, a cured film having a dry film thickness of from about 0.8 to 2.0 mils will be sandable with a hardness of at least 20 $mN/mm^2$. A sandable film is one that can be sanded by hand with commercially available sand paper of medium grit without excessive gumming of the paper.

In another embodiment, the disclosed coating compositions when cured provide films having a minimum gloss (60 degrees) of at least 70 on a dry film thickness of from about 0.8 to 2.0 mils, while in another embodiment, the gloss will be from about 70 to 98 (60 degrees) on a dry film thickness of about 0.8 to 2.0 mils.

In one embodiment, the disclosed coating compositions provide cured films having an elasticity of at least 20%, as measured using a Fischer microhardness tool such as the Fischerscope™ H100 SMC, available from H. Fischer GmbH-Sindelfingen. Relevant measurements can be taken with the following parameters, i.e., a cured coated test panel is placed face down on a stage and evaluated using a Vicker diamond pyramid applied at 25.000 mN/20 s. Test panels had a dry film build of from about 0.8 to 2.0 mils. Test panels were prepared by the application and curing of the disclosed coating compositions to bare or electrocoated substrates at cure schedules of from 140 degrees C. to 160 degrees C. for 15 to 30 minutes. No other coatings were applied to the test panels. Measurements were started using WIN-HCU™ software. In another embodiment, the disclosed coating compositions when cured provide films having an elasticity of from about 20% to about 35%.

While not wishing to be bound to a particular theory, it has been found that cured films of the disclosed coating composition that have an elasticity of less than 20% generally have a chip performance that is less than desirable. In one embodiment, it has been found that coating compositions having an elasticity of less than 20% generally have an unacceptable chip performance with more than 2% loss.

Multilayer coating systems utilizing the disclosed film-forming coating compositions can be prepared to provide improved chip performance. In one exemplary embodiment, the disclosed film-forming compositions will be used as primer, sealer, or anti-chip coating compositions, especially low VOC water borne or aqueous powder slurry primer compositions. In all such cases, the coating compositions are characterized by the presence of the binder and pigment mixture discussed above in the disclosed P/B ratio.

In one embodiment, a method of making a multilayer coating system having a chip performance of no more than 2% loss comprises applying a primer composition to a substrate to provide a primed substrate, applying a topcoat to the primed substrate, and curing the topcoat to provide a cured multilayer coating system.

In this case, the primer composition is the disclosed film-forming composition discussed herein. In one embodiment, the resulting cured multilayer coating system has a chip performance of no more than 2% film loss, while in another embodiment, the resulting cured multilayer coating system has a chip performance of from about 0.1 to about 1% film loss.

Suitable substrates include all automotive substrates, including but not limited to metal substrates, plastic substrates, and combinations thereof. Automotive substrates are especially suitable in as much as automobiles have predetermined areas, such as rocker panels and leading edges, which are more susceptible to becoming chipped and would benefit from the application of film-forming compositions or coating systems having improved chip resistance. The disclosed coating compositions may be applied to aluminum and galvanized steel. The disclosed primer, sealer, or anti-chip compositions disclosed herein may also be applied to automotive plastic substrates such as bumpers, mirror housings, or internal dashboards. Metal substrates such as steel or galvanized steel are used in one exemplary embodiment.

The substrate to which the primer composition is applied may be bare, pretreated, and/or coated with an applied electrodeposition coating as are known in the art. Such electrodeposition coatings may be cationic or anionic, with cationic electrodeposition coatings being used in one exemplary example. Substrates coated with an electrodeposition coating may be cured before or after the application of the primer composition disclosed herein. For example, the electrodeposition coating and the applied primer composition may be cured concurrently with the application of thermal energy for a time sufficient to effect crosslinking in both coatings. In one exemplary embodiment, the primer composition comprising a binder and a pigment mixture as described above will be applied to a cured electrodeposition coating.

The disclosed coating compositions when used as a primer is applied to a substrate so as to have a dry film build of from about 0.5 to about 5 mils. In one embodiment, the dry film build is from 0.8 to 4 mils, while in one exemplary embodiment the dry film build of the disclosed coating composition is from about 1 to about 3 mils. The substrate is flashed for three minutes in ambient conditions and then flashed for five minutes at 122 degree F.(50 C). The substrate is then baked for thirty minutes in an oven at 302 degree F.(150 C).

A topcoat layer is applied to the primer layer. The topcoat layer serves both aesthetic and functional purposes such as increasing gloss and resistance to acid-etch, respectively. The topcoat layer is applied to the primer layer and cured. The basecoat layer may contain one or more colorant and/or effect pigments as discussed above. The clearcoat layer is a transparent coating that provides an attractive smooth and glossy finish to the substrate and is applied to the basecoat layer. The basecoat layer and the clearcoat layer are usually applied wet-on-wet. The layers are applied in coats separated by a flash, as described below, with a flash also between the last coat of the color composition and the first clearcoat layer. The two coating layers are then cured simultaneously. In one embodiment, the film build of the cured basecoat layer is from about 0.6 to about 1.6 mils, while in another embodiment it is from about 0.8 to about 1.4 mils thick.

The dry film build of the cured clear coat layer in one embodiment is from about 1 to about 3 mils, while in a more exemplary embodiment it is from about 1.4 to about 2.4 mils.

The applied primer composition and the topcoat can be applied wet-on-wet. For example, the disclosed primer composition can be applied, then flashed, then the topcoat can be applied and flashed, then the primer and the topcoat can be cured at the same time. Again, the topcoat can include the basecoat layer and the clearcoat layer applied wet-on-wet.

It is also to be understood that different types of topcoats are compatible with the disclosed coating compositions. These different types include, but are not limited to, one-component solvent borne clearcoats, one-component waterborne clearcoats, two-component solvent borne clearcoats, and two-component waterborne clearcoats. In one exemplary embodiment, the topcoat will be a composite basecoat clearcoat coating.

In one exemplary embodiment, the topcoat is a crosslinking composition. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kind of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above.

Pigmented topcoats or basecoats used in the disclosed method may include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like, as well as effect pigments such as mica and the like.

Other materials well-known to the coatings artisan, for example, surfactants, fillers, stabilizers, wetting agents, dispersing agents, adhesion promoters, UV absorbers, light stabilizers such as HALS, antioxidants, solvents, catalysts, and/or rheology control agents, may also be incorporated into the topcoats or composite coatings used in the disclosed method. The amount of these materials used must be controlled to achieve the desired performance properties and/or to avoid adversely affecting the coating characteristics.

Each layer of the multilayer coating system can be applied to the substrate or previously applied coating layer according to any of a number of techniques well known in the art. These include, for example, spray coating, dip coating, roll coating, curtain coating, and the like. The electrodeposition coating is preferably applied by electrodeposition. For automotive applications, the disclosed film-forming coating composition and the topcoat layer or layers are preferably applied by spray coating, particularly electrostatic spray methods.

Coating layers of one mil or more are typically applied in two or more coats, separated by a time sufficient to allow some of the solvent or aqueous medium to evaporate, or "flash," from the applied layer. The flash may be at ambient or elevated temperatures, for example, the flash may use radiant heat.

In one embodiment, the layers described are cured with heat. Curing temperatures may be from 70 degree C. to 180 degree C., and particularly preferably from 170 degree F. to 200 degree F. (76 C to 93 C) for a composition including an unblocked acid catalyst, or from 240 degree F. to 325 degree F. (115 C to 163 C) for a composition including a blocked acid catalyst. Typical curing times at these temperatures range from 15 to 60 minutes, and preferably the temperature is chosen to allow a cure time of from 15 to 30 minutes. In a preferred embodiment, the coated substrate is an automotive body or part. The coats as applied can be from 0.5 mil up to 3 mils dry film build, and a sufficient number of coats are applied to yield the desired total film thickness of the multilayer coating system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention is further described in the following examples. The examples are merely illustrative and do not in any way limit the scope of the invention as described and claimed.

EXAMPLES

Preparation of Polyester Binder used in the Examples

The polyester binder used to prepare the disclosed coating compositions useful as primers is an aqueous polyester dispersion prepared from a combination of a series of monomers and a prepolymer.

The prepolymer is made by adding 307.8 parts by weight of neopentyl glycol to a 1000 ml reaction flask equipped with a stirrer and packed column for high temperature heating. Next, 72.4 parts of trimethylolpropane are added to the reaction flask. The mixture is stirred and heat is applied to the reaction flask via a heating mantle set for a target temperature of 100° C. (212° F.). Once a solution is obtained, 207.7 parts of adipic acid and 238.8 parts of isophthalic acid are added. The temperature of the mixture is then increased to 240° C. (464° F.) at a rate of 23.9° C. (75° F.) per hour. Once the targeted temperature is achieved, the reaction mixture is sampled every hour. The acid number of each hourly sample is determined. Samples are taken until the acid number is less than 7. Thereafter, the reaction mixture is cooled rapidly via a cooling bath of chilled water. Another sample is taken when the temperature of the reaction mixture has cooled to 150° C. (302° F.) to verify the final acid number. When the temperature reaches 120° C. (248 F), 247.0 parts of methyl isobutyl ketone is thoroughly mixed into the reaction mixture. Further addition of solvent can be made to achieve a targeted 80% solids.

For the second phase of the preparation of the polyester binder, the following reagents are added to a 1000 ml reaction flask: 56.34 parts by weight of fatty acid, 50.66 parts of 1,6-hexandiol, 58.98 parts of ethyl butyl propanediol, 57.21 parts isophthalic acid, 13.40 parts of trimethylolpropane and 7.08 parts of toluene. The reaction flask is next equipped with a packed column for high temperature heating. The reagents are mixed thoroughly and heat is applied over a period of 2 hours for a targeted temperature of about 230° C. (446° F.). The targeted temperature is maintained for one hour. Thereafter, samples are taken every 30 minutes for acid number determination. Once the acid number falls in the range of 9.5 to 10.5, heating is discontinued and the reaction mixture is cooled rapidly to 140° C. (284° F.). Next, 45.1 parts of trimellitic anhydride is added to the reaction mixture and heating is resumed for a targeted temperature of 170° C. (338° F.). After attaining 170° C., samples are taken every 30 minutes for acid number determination until the acid number value lies in the range of 52-55. The reaction mixture is then cooled to 120° C. (248° F.). Next, addition of 139.87 parts of the prepolymer prepared in the first phase is made to the reaction mixture along with 9.89 parts of methyl isobutyl ketone. The reaction mixture is stirred thoroughly for 30 minutes. The temperature of the mixture is then increased to 180° C. (356° F.). Removal of solvent is then initiated during this heating stage by vacuum. Samples are taken every 15 minutes until the acid number falls in the range to 29 to 31. Once the targeted acid number is attained, the mixture is cooled to 150° C. (302° F.). Addition of 31.67 parts of 3-methyl-3-methoxy-1-butanol is made to the mixture that is then stirred for another 30 minutes. The system is then cooled to 75° (167° F.) and the following are added: 10.66 parts of N,N-dimethylethanol amine, 93.4 parts methylated butylated melamine, 4.9 parts of polyether solution K2000, and 9.9 parts of 3-methyl-3-methoxy-1-butanol. Thorough mixing is conducted for a period of 30 minutes. Finally, 410.9 parts of deionized water are added to the batch and stirred thoroughly to achieve a homogeneous dispersion. The theoretical total non-volatiles are approximately 48 wt %.

Example 1

Primer with Titanium Dioxide Only.

A primer composition was prepared by first mixing together 32.6 parts by weight of BAYHYDROL 140 AQ polyurethane dispersion (about 40% nonvolatile, 59% water, and 1% toluene, pH of about 6.0 to about 7.5, anionic DESMODUR W/1,6-hexamethylene diisocyanate/polyester polyol-based polyurethane, available from Bayer Corporation, Pittsburgh, Pa.), 122.3 parts by weight of an emulsion of an acrylic polymer (glass transition temperature of 20° C., nonvolatile content of about 41% in water, acid number of about 8 mg KOH/g nonvolatile, hydroxyl equivalent weight of 510, salted with 2-amino-2-methylpropanol to a pH of about 6 to 7), 26.9 parts deionized water, and 530.0 parts by weight of pigment paste (60% by weight nonvolatile in water, nonvolatiles are 21.7% by weight of BAYHYDROL 140 AQ polyurethane resin, 76.8% by weight of titanium dioxide, 1.5% carbon black, ground on a horizontal mill to a fineness of 6 microns). To this mixture were added 18.9 parts by weight of RESIMENE 747 (a melamine formaldehyde resin available from Solutia, St. Louis, Mo.) A total of 265 parts of a polyester resin (40% solids, Acid number 32).A total of 3.7 parts by weight of an additive package (flow additive and thickener) was then added. Finally, the pH of the primer composition was adjusted to about 8.0 with 2-amino-2-methylpropanol.

The primer composition had a nonvolatile content of 52% by weight. The volatile organic content of the primer composition was 85 grams/liter. The primer composition was adjusted before spray application with deionized water to a viscosity of 120 to 150 centipoise at 384 sec$^{-1}$.

Example 2

Primer with Titanium Dioxide and Barium Sulfate

A primer composition which included barium sulfate (BaSO$_4$) was prepared by first mixing together 30.2 parts by weight of BAYHYDROL 140 AQ polyurethane dispersion (about 40% nonvolatile, 59% water, and 1% toluene, pH of about 6.0 to about 7.5, anionic DESMODURE W/1,6-hexamethylene diisocyanate/polyester polyol-based polyurethane, available from Bayer Corporation, Pittsburgh, Pa.), 113.1 parts by weight of an emulsion of an acrylic polymer (glass transition temperature of 20° C., nonvolatile content of about 41% in water, acid number of about 8 mg KOH/g nonvolatile, hydroxyl equivalent weight of 510, salted with 2-amino-2-methylpropanol to a pH of about 6 to 7), 24.9 parts deionized water, and 565.4 parts by weight of pigment paste (65.6% by weight nonvolatile in water, nonvolatiles are 17.2% by weight of BAYHYDROL 140 AQ polyurethane resin, 60.9% by weight of titanium dioxide, 1.2% carbon black and 20.7% barium sulfate, ground on a horizontal mill to a fineness of 6 microns). To this mixture were added 17.5 parts by weight of RESIMENE 747 (a melamine formaldehyde resin available from Solutia, St. Louis, Mo.) followed by addition of 245.0 parts of a polyester resin (40% solids, Acid number 32). Next, a total of 3.5 parts by weight of an additive package (flow additive and thickener) was added. Finally, the pH of the primer composition was adjusted to about 8.0 with 2-amino-2-methylpropanol. The primer composition had a nonvolatile content of 56% by weight. The volatile organic content of the primer composition was 85 grams/liter. The primer composition was adjusted before spray application with deionized water to a viscosity of 120 to 150 centipoise at 384 sec$^{-1}$.

Example 3

Primer with Titanium Dioxide and Talc

A primer composition which included talc (magnesium silicate) was prepared by first mixing together 31.3 parts by weight of BAYHYDROL 140 AQ polyurethane dispersion (about 40% nonvolatile, 59% water, and 1% toluene, pH of about 6.0 to about 7.5, anionic Desmodur W/1,6-hexamethylene diisocyanate/polyester polyol-based polyurethane, available from Bayer Corporation, Pittsburgh, Pa.) 117.5 parts by weight of an emulsion of an acrylic polymer (glass transition temperature of 20° C., nonvolatile content of about 41% in water, acid number of about 8 mg KOH/g nonvolatile, hydroxyl equivalent weight of 510, salted with 2-amino-2-methylpropanol to a pH of about 6 to 7), 25.8 parts deionized water, and 548.4 parts by weight of pigment paste (65.4% by weight nonvolatile in water, nonvolatiles are 18.4% by weight of BAYHYDROL 140 AQ polyurethane resin, 65.5% by weight of titanium dioxide, 1.3% carbon black and 14.8% talc, ground on a horizontal mill to a fineness of 6 microns). To this mixture were added 18.2 parts by weight of RESIMENE 747 (a melamine formaldehyde resin available from Solutia, St. Louis, Mo.) followed by addition of 245.0 parts of a polyester resin (40% solids, acid number 32). Next, a total of 3.6 parts by weight of an additive package (flow additive and thickener) was added. Finally, the pH of the primer composition was adjusted to about 8.0 with 2-amino-2-methylpropanol. The primer composition had a nonvolatile content of 56% by weight. The volatile organic content of the primer composition is 85 grams/liter. The primer composition was adjusted before spray application with deionized water to a viscosity of 120 to 150 centipoise at 384 sec$^{-1}$.

Primer Evaluation

The primer compositions of Examples 1, 2 and 3 were applied to electrocoat primed 4" by 12" steel panels and cured for 25 minutes at 15° C. to form a primer layer of about 25 microns dry film thickness. The cured primer was then topcoated with commercial basecoat and clearcoat compositions. The panels were then subjected to gravelometer testing according to the test procedure of SAE J400. Briefly, in the SAE J400 procedure, the panels are cooled to −20° C. for 1 hour prior to the gravel test. The panel is positioned in a gravelometer machine in an upright position, 90° from path of gravel. One pint of gravel is blown onto the panel with an air pressure of 70 psi. The panel is then warmed to room temperature, tape pulled with 3M 898 strapping tape, and rated according to chip rating standards on a scale of 1 to 5, with 1 corresponding to a standard having more than 4% topcoat paint loss and 5 corresponding to a standard having less than 0.3% paint loss due to chipping. The gravelometer ratings for the panels obtained using the compositions of Examples 1, 2, and 3 are shown in the following table.

Evaluation of % Paint Loss

Each sample chip panel was first scanned using a Vieew digital image analyzer by Atlas Analytical Instruments. The digital image was evaluated using the Vieew software Aquinto a4i version 5.00 (level 593). The Particle Analysis procedure in the software was used to determine the actual percentage of paint loss by defining a color contrast to differentiate the failure mode at the substrate and at the primer. Each paint sample was analyzed in triplicates to obtain an average value of the % paint loss.

Fischer Microharndess

Fischerscope® H100C equipped with a pyramid shaped diamond indenter was used to measure the microhardness of the primer. The panel was placed on the stage of the instrument with the primer surface facing the indenter and secured with the instrument lever. The instrument was connected to a computer and was interactive via the WIN-HCU software so that measuring parameters could be defined. In the test setup procedure used, a maximum force of 25 mN was applied over a period of 20 seconds and held constant for a period of 5 seconds. The force was then unloaded from 25 mN over 20 seconds and maintained at minimum force for 5 second. A series of three readings was taken at 25 micron film build on the same sample panel at different spots, all in close proximity. The average of three sets of measurements was obtained and included HU, the universal hardness in N/mm$^2$; h max, the maximum indentation, in micrometers; Cr1, the Creep at maximum force in %; Cr2, the Creep at minimum force in %; Y, Young's Modulus in giga-Pascals and We/Wtot, the elastic deformation work of the total material deformation work in %.

TABLE 1

| Example | P/B Ratios TiO2/BaSO4/Talc | Chip Rating | % Paint Loss | Elastic Component % We/Wtot |
|---|---|---|---|---|
| 1 | 0.9/0.0/0.0 | 4.0 | 0.40 | 27.4 |
| 2 | 0.9/0.3/0.0 | 2.5 | 0.91 | 22.7 |
| 3 | 0.9/0.0/0.2 | 3.0 | 0.80 | 24.9 |

It can be seen that the disclosed coating compositions provide improved chip resistance.

We claim:

1. A film-forming composition, comprising:
 a film-forming binder comprising at least one of an acrylic polymer, a modified acrylic polymer, a polyurethane polymer, a polyester prepared by the polyesterification of organic polycarboxylic acids or their anhydrides with organic polyols comprising primary or secondary hydroxyl groups, a polyester polyurethane polymer, or a combination thereof; and
 a pigment mixture, said pigment mixture present in a pigment to binder ratio of 0.8 to 0.99, and consisting of:
  (i) at least 80% of titanium dioxide by weight, based on the total weight of the pigment mixture; and
  (ii) no more than 20% by weight of non-titanium dioxide pigments based on the total weight of the pigment mixture, said non-titanium dioxide pigments being selected from the group consisting of carbon black, talc, barium sulfate, magnesium silicate, and combinations comprising two or more of the foregoing; wherein the film-forming composition has an adjusted VOC of no more than 100 g/L, is free of all pigments other than those in the pigment mixture, has a viscosity of no more than 200 cps at 384 sec$^{-1}$, and when cured for 25 minutes at 150C. provides a cured film having an elasticity of at least 20% at a dry film build of from 0.8 to 2.0 mil on cold rolled steel.

2. The film-forming composition of claim 1, wherein the cured film is sandable and has a hardness of at least 20 mN/mm$^2$.

3. The film-forming composition of claim 1, wherein the pigment mixture is present in a pigment to binder ratio of from 0.85 to 0.95.

4. The film-forming composition of claim 1, wherein the pigment mixture consists of 100% by weight of titanium dioxide, based on the total weight of the pigment mixture.

5. The film-forming composition of claim 1, wherein the pigment mixture consists of from 85 to 100 % by weight of titanium dioxide, based on the total weight of the pigment mixture.

6. A multilayer coating system consisting essentially of:
 a substrate;
 an electrodeposition coating;
 a primer composition, comprising:
  a film-forming binder comprising at least one of an acrylic polymer, a modified acrylic polymer, a polyurethane polymer, a polyester prepared by the polyesterification of organic polycarboxylic acids or their anhydrides with organic polyols comprising primary or secondary hydroxyl groups, a polyester polyurethane polymer, or a combination thereof;
  a pigment mixture, said pigment mixture present in a pigment to binder ratio of 0.8 to 0.99, and consisting of:
   (i) at least 80% of titanium dioxide by weight, based on the total weight of the pigment mixture; and
   (ii) no more than 20% by weight of non-titanium dioxide pigments based on the total weight of the pigment mixture, said non-titanium dioxide pigments being selected from the group consisting of carbon black, talc, barium sulfate, magnesium silicate, and combinations comprising two or more of the foregoing; and
 a topcoat;
 wherein the primer composition has an adjusted VOC of no more than 100 g/L, is free of all pigments other than those in the pigment mixture, and has a viscosity of no more than 200 cps (at 384 sec$^{-1}$).

7. The coating system of claim 6, wherein the coating system has a chip performance of no more than 2%.

8. The coating system of claim 6, wherein the film-forming primer composition has an elasticity of at least 20% when cured for 25 minutes at 150° C. at a dry film build of from 0.8 to 2.0 mil on cold rolled steel.

9. The coating system of claim 6, wherein the topcoat comprises a basecoat and a clearcoat.

10. The coating system of claim 9, wherein the basecoat and clearcoat are a composite coating that is applied wet on wet.

11. A method of making a multilayer coating system, consisting of:
 applying a primer composition to a substrate to provide a primed substrate;
 applying a topcoat to the primed substrate; and
 curing the topcoat to provide a cured multilayer coating system;
 wherein the cured multilayer coating system has a chip performance of no more than 2%;
 wherein the primer composition comprises:
  a film-forming binder comprising at least one of an acrylic polymer, a modified acrylic polymer, a polyurethane polymer, a polyester prepared by the polyesterification of organic polycarboxylic acids or their anhydrides with organic polyols comprising primary or secondary hydroxyl groups, a polyester polyurethane polymer, or a combination thereof and a pigment mixture, said pigment mixture present in a pigment to binder ratio of 0.8 to 0.99, and consisting of:
(i) at least 80% of titanium dioxide by weight, based on the total weight of the pigment mixture; and
(ii) no more than 20% by weight of non-titanium dioxide pigments based on the total weight of the pigment mixture, said non-titanium dioxide pigments being selected from the group consisting of carbon black, talc, barium sulfate, magnesium silicate, and combinations comprising two or more of the foregoing; and wherein the primer composition has an adjusted VOC of no more than 100 g/L, is free of all pigments other than those in the pigment mixture, has a viscosity of no more than 150 cps at 384 sec$^{-1}$, and has an elasticity of at least 20% at a dry film build of from 0.8 to 2.0 mil on cold rolled steel.

12. The method of claim 11, wherein the substrate comprises an electrodeposition coating.

13. The method of claim 12, wherein the electrodeposition coating has been cured before the application of the primer composition.

14. The method of claim 11, further comprising curing the applied primer before the application of the topcoat.

15. The method of claim 11, wherein the topcoat comprises a composite basecoat and a clearcoat that is applied wet on wet.

16. A method of making a multilayer coating system having a chip performance of no more than 2% loss, comprising:
applying a primer composition to a substrate to provide a primed substrate, said primer composition having an elasticity of at least 20% at a dry film build of from 0.8 to 2.0 mil on cold rolled steel and comprising:
a film-forming binder comprising at least one of an acrylic polymer, a modified acrylic polymer, a polyurethane polymer, a polyester prepared by the polyesterification of organic polycarboxylic acids or their anhydrides with organic polyols comprising primary or secondary hydroxyl groups, a polyester polyurethane polymer, or a combination thereof; and a pigment mixture, said pigment mixture present in a pigment to binder ratio of 0.8 to 0.99, and consisting of:
(i) at least 80% of titanium dioxide by weight, based on the total weight of the pigment mixture; and
(ii) no more than 20% by weight of non-titanium dioxide pigments based on the total weight of the pigment mixture, said non-titanium dioxide pigments being selected from the group consisting of carbon black, talc, barium sulfate, magnesium silicate, and combinations comprising two or more of the foregoing;

applying a topcoat to the primed substrate; and curing the topcoat to provide a cured multilayer coating system;

wherein the cured multilayer coating system has a chip performance of no more than 2%.

17. A method of making a coated substrate, comprising applying the film-forming composition of claim 1 to a substrate and curing the film-forming composition to provide a coated substrate comprising a cured film.

18. A coated substrate comprising a cured film made by the method of claim 17.

19. The coated substrate of claim 18, wherein the cured film has an elasticity of at least 20% at a dry film build of from 0.8 to 2.0 mil on cold rolled steel.

* * * * *